US012717964B2

(12) United States Patent
Jalal et al.

(10) Patent No.: US 12,717,964 B2
(45) Date of Patent: Aug. 25, 2026

(54) PRIVACY-PRESERVING COMPUTING ON SUBJECT DATA USED TO DEVELOP ARTIFICIAL INTELLIGENCE TOOLS

(71) Applicant: Genentech, Inc., South San Francisco, CA (US)

(72) Inventors: Niaz Ahsan Jalal, South San Francisco, CA (US); Abdesslem Dridi, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 357 days.

(21) Appl. No.: 18/305,929

(22) Filed: Apr. 24, 2023

(65) Prior Publication Data

US 2023/0259654 A1 Aug. 17, 2023

Related U.S. Application Data

(63) Continuation of application No. PCT/US2021/058413, filed on Nov. 8, 2021.

(Continued)

(51) Int. Cl.
*G06F 21/62* (2013.01)

(52) U.S. Cl.
CPC ................................ *G06F 21/6254* (2013.01)

(58) Field of Classification Search
CPC ................................................... G06F 21/6254
See application file for complete search history.

(56) References Cited

U.S. PATENT DOCUMENTS

2013/0124525 A1* 5/2013 Anderson ............. G06F 16/278
707/737
2013/0208966 A1 8/2013 Zhao et al.
(Continued)

FOREIGN PATENT DOCUMENTS

JP 2004-341967 A 12/2004
JP 2020-530634 A 10/2020
WO 2020/157939 A1 8/2020

OTHER PUBLICATIONS

International Application No. PCT/US2021/058413, "International Search Report and Written Opinion", Mar. 30, 2022, 18 pages.
(Continued)

*Primary Examiner* — Dhairya A Patel
*Assistant Examiner* — Eui H Kim
(74) *Attorney, Agent, or Firm* — Kilpatrick Townsend & Stockton LLP

(57) ABSTRACT

The present disclosure relates to techniques for privacy-preserving computing to protect a subject's privacy while using the subject's data for secondary purposes such as training and deploying artificial intelligence tools. Particularly, aspects are directed to receiving, at a local server, subject data regarding a first subject, performing, by the local server, a de-identifying operation, an anonymizing operation, or both on the subject data, sending the subject data to a remote server, receiving a production model from the remote server, the production model including parameters derived in part from the processed subject data, receiving, at the local server, subsequent data regarding a second subject, inputting, by the local server, the subsequent data into the production model to analyze the subsequent data and generate an inference or prediction from the analysis of the subsequent data; and sending, by the local server, the inference or the prediction to a computing device.

20 Claims, 5 Drawing Sheets

Related U.S. Application Data

(60) Provisional application No. 63/111,993, filed on Nov. 10, 2020.

(56) References Cited

U.S. PATENT DOCUMENTS

| | | | | |
|---|---|---|---|---|
| 2014/0244309 | A1* | 8/2014 | Francois | G16H 50/20 705/2 |
| 2017/0061311 | A1 | 3/2017 | Liu | |
| 2017/0372096 | A1* | 12/2017 | Yousfi | G06F 21/6254 |
| 2018/0199891 | A1* | 7/2018 | Chang | G16H 40/67 |
| 2019/0197418 | A1* | 6/2019 | Abutbul | G06F 9/54 |
| 2019/0272335 | A1* | 9/2019 | Liu | G06F 16/21 |
| 2020/0125893 | A1* | 4/2020 | Choi | G06F 11/3438 |
| 2020/0161005 | A1* | 5/2020 | Lyman | G06Q 10/06315 |
| 2020/0334810 | A1 | 10/2020 | Accomazzi et al. | |
| 2021/0158936 | A1* | 5/2021 | Rao | G16H 30/40 |
| 2021/0365734 | A1* | 11/2021 | Rastogi | G06F 18/2148 |

OTHER PUBLICATIONS

International Application No. PCT/US2021/058413, “Invitation to Pay Additional Fees and, Where Applicable, Protest Fee”, Feb. 9, 2022, 13 pages.

* cited by examiner

PRIVACY-PRESERVING COMPUTING ON SUBJECT DATA USED TO DEVELOP ARTIFICIAL INTELLIGENCE TOOLS

CROSS-REFERENCE TO RELATED APPLICATIONS

This application is a continuation of International Application No. PCT/US2021/058413, filed on Nov. 8, 2021, which claims the benefit of and priority to U.S. Provisional Application No. 63/111,993, filed on Nov. 10, 2020, each of which is hereby incorporated by reference in their entireties for all purposes.

FIELD

The present disclosure relates to digital and personalized healthcare, and in particular to techniques for privacy-preserving computing to protect a subject's privacy while using the subject's data for secondary purposes such as training and deploying artificial intelligence tools.

BACKGROUND

Modern computing paradigms, including cloud computing, data parallel cluster computing, and high performance computing, combined with a widely available variety of machine learning and deep learning algorithmic architectures, have created an environment in which a vast array of artificial intelligence (AI) applications can be developed to solve problems in almost any industry, if enough data is available to optimize the underlying algorithm properly. It is now clear that access to data is a primary barrier to the development of AI applications. In fact, in many industries, it is necessary to use data from a variety of sources in order to create AI that is robust, generalizable, and unbiased. A specific challenge is that, in general, the owners of data often cannot or will not share the data or allow the data to leave their control. This is understandable since data often contains highly sensitive private and/or personal data and can be regulated in ways that make it difficult or impossible to share. These challenges are particularly difficult to overcome in the development of healthcare AI.

In healthcare AI, data-driven technology solutions are being developed to further personalize healthcare all while reducing costs. Healthcare providers are innovating solutions for automating and streamlining the process of analyzing subject data to determine a medical prediction. Machine-learning (ML) techniques may be used for a number of healthcare-related predictions, such as disease diagnosis and prognosis as well as for predicting treatment efficacy. Because medical data typically contains private/identification data for the subjects from which it is generated, government regulation (e.g., Health Insurance Portability and Accountability Act (HIPAA), "good practice" quality guidelines and regulations (GxP), and General Data Protection Regulation (GDPR) compliance becomes a unique challenge for healthcare providers looking into machine learning for medical analysis. Training ML models can involve a large amount of data, so it can be difficult to access a sufficient amount of data that is de-identified and/or anonymize to train effective ML models. Accordingly, there is a need for advances in compliant software platforms, built to provide accurate medical predictions while ensuring the confidentiality, availability and integrity of protected healthcare information.

SUMMARY

In various embodiments, a computer-implemented method is provided that comprises: receiving subject data regarding a first subject from a first computing device associated with the first subject; performing a de-identifying operation, an anonymizing operation, or both on the subject data to generate processed subject data; storing the processed subject data in a processed data store accessible to the local cloud server; sending a batch of data to a remote cloud server, the batch of data comprising the processed subject data; receiving a production model from the remote cloud server, the production model including parameters derived in part from the processed subject data; receiving subsequent data regarding a second subject from a second computing device associated with the second subject; inputting the subsequent data into the production model to analyze the subsequent data and generate an inference or prediction from the analysis of the subsequent data; and sending the inference or the prediction to the second computing device, a third computing device, or both for use in one or more operations performed by the second computing device, the third computing device, or a combination thereof.

In some embodiments, the local cloud server is physically located in a same geographic region as the subject.

In some embodiments, the same geographic region is a same country.

In some embodiments, the subject data is health care data comprising individually identifiable health information and the subsequent data is subsequent healthcare data comprising individually identifiable health information.

In some embodiments, the same geographic region collectively shares a set of data regulations regarding use and storage of the individually identifiable health information.

In some embodiments, the de-identifying operation, the anonymizing operation, or both are performed on the individually identifiable health information of the subject data based on the set of data regulations.

In some embodiments, the first computing device is the same or different device as the second computing device.

In some embodiments, the first computing device is a clinical device sensor, a handheld portable device, or a combination thereof.

In some embodiments, the second computing device is a clinical device sensor, a handheld portable device, or a combination thereof.

In some embodiments, the first subject is the same or different subject as the second subject.

In some embodiments, the processed data store is not accessible to the remote cloud server.

In some embodiments, sending the processed subject data as a part of the batch of data to the remote cloud server occurs responsive to the local cloud server having not received a request for deletion of the processed subject data prior to the sending the processed subject data.

In some embodiments, the method further comprises: prior to performing the de-identifying operation, the anonymizing operation, or both on the subject data, storing the subject data in a raw data store accessible to the local cloud server; receiving a request to delete the subject data from the remote cloud server; and in response to receiving the request to delete the subject data, deleting the subject data from the raw data store.

In some embodiments, the processed subject data is not deleted from the processed data store.

In some embodiments, the sending the processed subject data as a part of the batch of data occurs at a periodic or stochastic timing such that the batch of data includes data from multiple other subjects captured since a previous sending of data to the remote cloud server.

In some embodiments, the inference or the prediction are generated with respect to a diagnosis, a prognosis, a treatment or therapy, identification of a treatment or therapy protocol, detection or determination of a disease state, identification or detection of a biomarker, a reduction in treatment or therapy non-adherence, a reduction in operational cost, image analysis, marketing of a treatment or therapy, automation of an administrative task, assistance with a medical procedure, or any combination thereof.

In some embodiments, the one or more operations include communicating or displaying the inference or the prediction, analysis of the =inference or the prediction, providing a treatment or therapy, initiating a treatment or therapy protocol, measuring a biomarker, providing a notice or reminder for a treatment or therapy, obtaining healthcare data, reporting a diagnosis or a prognosis, analyzing an image, providing marketing regarding a treatment or therapy, control of a medical device or a medical procedure, or any combination thereof.

In some embodiments, the method further comprises sending a subsequent batch of data to the remote cloud server, the subsequent batch of data comprising the inference or the prediction.

In some embodiments, the method further comprises: performing the de-identifying operation, the anonymizing operation, or both on the subsequent data to generate processed subsequent data; storing the processed subsequent data in the processed data store accessible to the local cloud server; and sending a batch of data to the remote cloud server, the batch of data comprising the processed subsequent data.

In some embodiments, the method further comprises: performing the de-identifying operation, the anonymizing operation, or both on the inference or the prediction to generate processed output data; storing the processed output data in the processed data store accessible to the local cloud server; and sending a batch of data to the remote cloud server, the batch of data comprising the processed output data.

In some embodiments, the method further comprises: receiving response data at the local cloud server from the second computing device, the third computing device, or both generated in response to receiving the inference or the prediction or using the inference or the prediction in the one or more operations; performing the de-identifying operation, the anonymizing operation, or both on the response data to generate processed response data; storing the processed response data in the processed data store; and sending a batch of data to the remote cloud server, the batch of data comprising the processed response data.

In some embodiments, the method further comprises: receiving a new production model from the remote cloud server, the new production model including parameters derived in part from the processed response data; and replacing the production model with the new production model, wherein the replacing includes deleting the production model from the local cloud server.

In various embodiments, a computer-implemented method is provided that comprises: receiving processed subject data associated with a plurality of different subjects from a local cloud server, the processed subject data having been de-identified, anonymized, or both; associating the processed subject dataset with a versioned dataset; determining an expiration date for the versioned dataset; storing the versioned dataset in a version data store accessible to the remote cloud server, the versioned dataset stored in association with the expiration date; training a production model using the versioned dataset; storing, in the versioned data store, an association between the versioned dataset and the production model trained with the version dataset; and sending the production model to the local cloud server for use in analyzing subsequent data and generating an inference or prediction from the analysis of the subsequent data.

In some embodiments, the local cloud server is physically located in a same geographic region as the subjects.

In some embodiments, the same geographic region is a same country.

In some embodiments, the processed subject data is health care data comprising individually identifiable health information and the subsequent data is subsequent healthcare data comprising individually identifiable health information.

In some embodiments, the remote cloud server is physically located in a same or different geographic region as the local cloud server.

In some embodiments, the same or different geographic region is a same or different country.

In some embodiments, the version data store is not accessible to the local cloud server.

In some embodiments, the same geographic region collectively shares a set of data regulations regarding use and storage of the individually identifiable health information.

In some embodiments, the individually identifiable health information of the processed subject data has been de-identified, anonymized, or both based on the set of data regulations.

In some embodiments, the expiration date is determined based a date of creation of the versioned dataset, a date of receipt of the processed subject data, an expiry of an informed consent form associated with the processed subject dataset, or any combination thereof.

In some embodiments, the method further comprises: storing the production model in the versioned data store accessible to the remote cloud server; and in response to the expiration date passing, deleting or removing the versioned dataset and the production model from the versioned data store.

In some embodiments, the method further comprises: training another production model using the versioned dataset and/or another versioned dataset; storing, in the versioned data store, an association between the versioned dataset and/or the another versioned dataset and the another production model trained with the versioned dataset and/or the another versioned dataset; and sending the another production model to the local cloud server for use in analyzing the subsequent data and generating the inference or prediction from the analysis of the subsequent data, wherein the another production model is sent with an instruction to the local cloud server to replace the production model with the another production model.

In some embodiments, the inference or the prediction are generated with respect to a diagnosis, a prognosis, a treatment or therapy, identification of a treatment or therapy protocol, detection or determination of a disease state, identification or detection of a biomarker, a reduction in treatment or therapy non-adherence, a reduction in operational cost, image analysis, marketing of a treatment or therapy, automation of an administrative task, assistance with a medical procedure, or any combination thereof.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
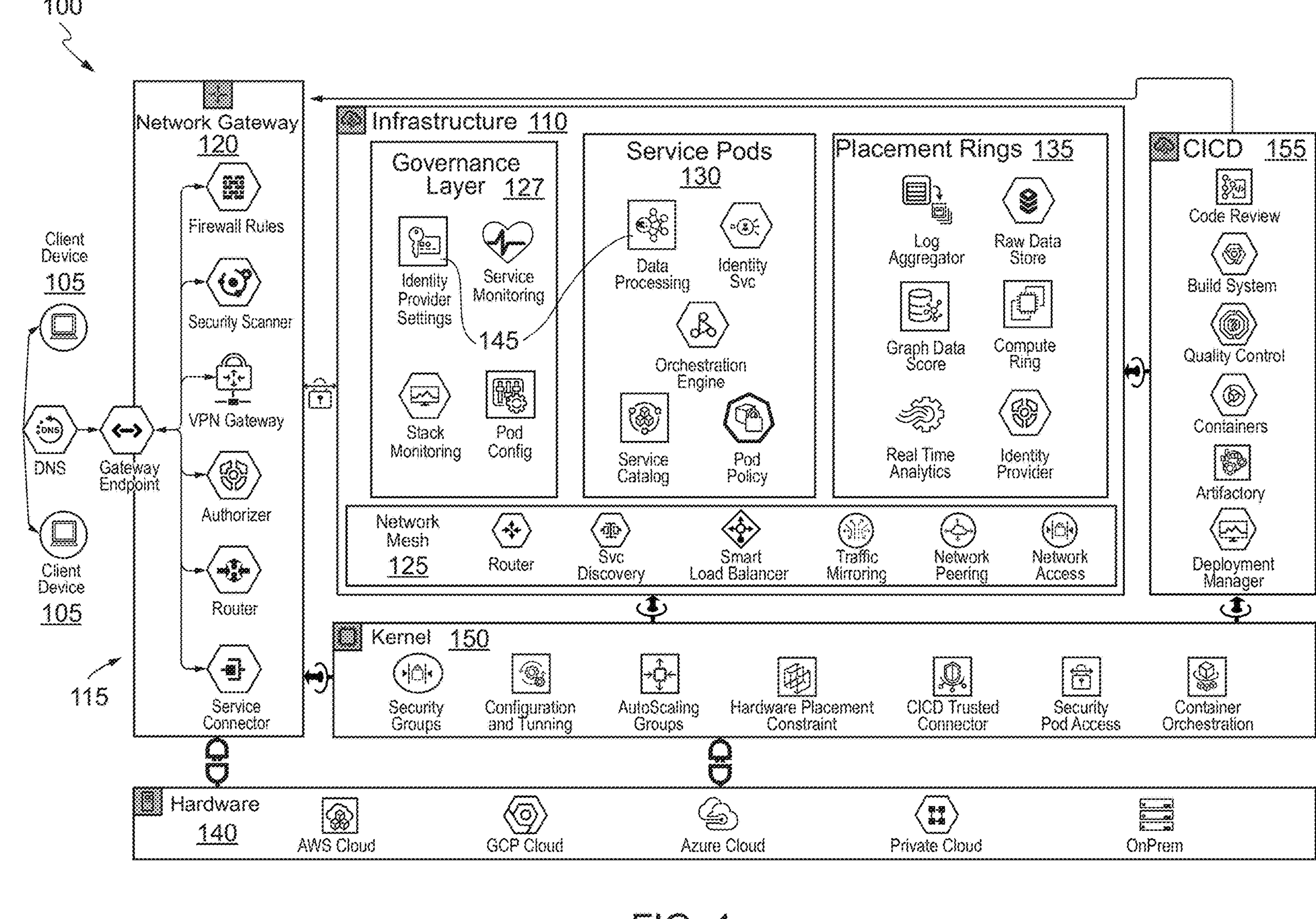
FIG. 1 depicts a diagram of a digital health platform for providing data-driven technology solutions according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for privacy-preserving computing to protect a subject's privacy while using the subject's data for secondary purposes such as training and deploying artificial intelligence tools. More specifically, embodiments of the present disclosure provide a digital and personalized healthcare platform that facilitates application and/or algorithm development and deployment in a privacy preserving manner. It should be appreciated that although various embodiments of machine learning and algorithmic architecture are disclosed herein in which AI and ML models (referred to hereafter simply as models) are developed to solve problems in the health care industry, these architectures and techniques can be implemented in other types of systems and settings. For example, these architectures and techniques can be implemented in the development of models in many industries (financial, life sciences, supply chain, national security, law enforcement, public safety, etc.) in which the sensitivity of the data (whether it contains trade secrets or private data about individuals, for example) precludes sharing of the data outside the boundaries of the organization that is responsible for its protection.

A significant challenge when dealing with healthcare data is the issue of privacy. Healthcare data comes in many different forms such as clinical data, clinical trials data, genomic data, subject-generated data, internet of things (IoT) data, social media data, registry data, survey data, medical device data, and the like. Healthcare data typically includes protected health information, which is any information that may be transmitted or kept by one of the entities covered under government regulation (e.g., HIPAA, GxP, and GDPR) that includes individually identifiable health information. Individually identifiable health information includes any information that may identify the subject as an individual such as name, address, birth date, social security number, and the like. It also may include in either the present, past or future any information related to the subject's physical or mental health, the provision of health care to the individual, or information regarding payment for the provision of health care to the patient. There are numerous legal, cultural, and technical challenges associated with collecting, sharing, and processing healthcare data for secondary purposes such as training and deploying artificial intelligence tools. For example, many countries have strict privacy laws and regulations that have to be adhered to when it comes to dealing with an individual subject's identifiable health information. This can make collecting healthcare data, sharing, and processing such data a significant challenge.

To overcome these challenges, conventional techniques for privacy-preserving computing concentrate on safeguarding the healthcare data and their associated models. This combination aims to guarantee control over the input data and the models, integrity of the computational process and its results, and to offer trustworthy and transparently auditable technical implementations (structured transparency). Such systems are constructed to resist attacks against the dataset for example identity or membership inference/tracing (determining whether an individual is present in a given dataset) and feature/attribute re-derivation/re-identification (extraction of characteristics of an individual from within the dataset, for example by linkage attacks). The systems are also constructed to withstand attacks on the algorithm or the computational process—for instance, modification of algorithm parameters (for example, by poisoning)—or derivation of information about the dataset from them (model-inversion/reconstruction). Finally, the systems are also constructed to protect the data and the algorithms from theft both in storage and when transmitted over networks (asset/integrity protection).

Despite the aforementioned techniques to protect the healthcare data while performing collecting, training, and deployment, many organizations avoid the use of healthcare data all together due to increased time to market, costs, and increased complexity of the model development. For example, the timeline to complete the required steps to secure and use privacy-protected data for the model development exceeds the typical research and development investment return expectations.

To address these limitations and problems, the techniques for privacy-preserving computing in the present disclosure utilize an optimized data flow that splits training and deployment of the model among a local server and a remote server. The local server is stored in a computing device (e.g., a cloud server) that is physically located within the region (e.g., country or state) of origin of the data (e.g., healthcare data). Whereas, the remote server is maintained without regard to the region of origin of the data. In some instances, the remote server is located in a same region as the local server (but separate from one another). In other instances, the remote server is located in a different region from that of the local server. The local server is adapted to receive data and perform a de-identifying and/or anonymizing operation on the data to generate privacy-protected data.

As used herein, "anonymizing" is the act of permanently and completely removing personal identifiers from data, such as converting personally identifiable information into aggregated data. Anonymized data is data that can no longer be associated with an individual in any manner. Once this data is stripped of personally identifying elements, those elements can never be re-associated with the data or the underlying individual. In contrast, as used herein "de-identifying" is the act of removing personally identifying information in order to protect personal privacy. De-identified data may not necessarily be anonymized data. In other words, for de-identified data the personally identifying information may be able to be re-associated with the data or the underlying individual at a later time. Thereafter, the local server is further adapted to send a batch of data including the privacy-protected data to the remote server for downstream processing.

The remote server is adapted to associate the privacy-protected data with a versioned dataset such that the privacy-protected data is now subject to version control. The remote server is further adapted to determine an expiration date of the versioned dataset and store the versioned dataset with the expiration date in a data store. The remote server is further adapted to train a model using the versioned dataset. The model comprises parameters that are learned or derive based on minimizing a one or more loss functions. The remote server is further adapted to generate and store a mapping between the versioned dataset and the model in the data store such that the model is now connected with the versioned dataset and thus also subject to version control. The remote server is further adapted to send the model to the local server for deployment. Thereafter, the model may be implemented on the local server for application to data (e.g., providing analysis or a prediction in response to processing the healthcare data).

One illustrative embodiment of the present disclosure is directed to a method carried out by a local server that includes: receiving subject data regarding a first subject from a first computing device associated with the first subject; performing a de-identifying operation, an anonymizing operation, or both on the subject data to generate processed subject data; storing the processed subject data in a processed data store accessible to the local cloud server; sending a batch of data to a remote cloud server, the batch of data comprising the processed subject data; receiving a production model from the remote cloud server, the production model including parameters derived in part from the processed subject data; receiving subsequent data regarding a second subject from a second computing device associated with the second subject; inputting the subsequent data into the production model to analyze the subsequent data and generate an inference or prediction from the analysis of the subsequent data; and sending the inference or the prediction to the second computing device, a third computing device, or both for use in one or more operations performed by the second computing device, the third computing device, or a combination thereof.

Another illustrative embodiments of the present disclosure is directed to a method carried out by a remote server that includes: receiving processed subject data associated with a plurality of different subjects from a local cloud server, the processed subject data having been de-identified, anonymized, or both; associating the processed subject dataset with a versioned dataset; determining an expiration date for the versioned dataset; storing the versioned dataset in a version data store accessible to the remote cloud server, the versioned dataset stored in association with the expiration date; training a production model using the versioned dataset; storing, in the versioned data store, an association between the versioned dataset and the production model trained with the version dataset; and sending the production model to the local cloud server for use in analyzing subsequent data and generating an inference or prediction from the analysis of the subsequent data.

II. Digital Health Platform

FIG. 1 depicts a simplified diagram of a digital health platform 100 for providing data-driven technology solutions in accordance with various embodiments. In the illustrated embodiment, digital health platform 100 includes client computing devices 105 coupled to a cloud based infrastructure 110 via a network(s) 115 including network gateway 120 and network mesh 125. The infrastructure 110 is adapted to execute services or software applications within service pods 130 using resources provisioned within placement rings 135 by cloud service providers 140 (e.g., a distributed computing environment) using various hardware and cloud infrastructure (e.g., private cloud or on-premise cloud infrastructure and public cloud infrastructure). These services or software applications may be offered as web-based or cloud services, such as under an AaaS or SaaS model to users of client computing devices 105. Several providers offer cloud services such as Amazon, Google, and Oracle. The term cloud service is generally used to refer to a service that is made available to users on demand and via a communication network such as the Internet by systems (e.g., infrastructure 110) of a service provider such as a government regulated entity. Consumers may thus avail themselves of cloud services provided by a service provider without having to purchase separate licenses, support, or hardware and software resources that support the services. For example, a cloud service provider's system may host the one or more programs, and a user may, via the Internet, on demand, use the one or more programs without the user having to buy infrastructure resources for executing the one or more programs. Cloud services are designed to provide easy, scalable access to applications, resources and services.

In some instances, users (e.g., software or service consumers) operating client computing devices 105 utilize one or more client applications to consume the software products, services, or systems provided by various components 145 of the infrastructure 110. In other instances, users (e.g., developers) operating client computing devices 105 utilize one or more client applications to upload source code for the software products, services, or systems to be provided by the various components 145 of the infrastructure 110. The components 145 include software components that may be executed by one or more processors, hardware components, or combinations thereof. It should be appreciated that various different system configurations are possible, which may be different from those illustrated for the digital health platform 100. The embodiment shown in FIG. 1 is thus one example of a distributed computing environment for implementing a digital health platform and is not intended to be limiting.

The client computing devices 105 include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Fitbit Versa™ smart watch, virtual reality (VR) or augment reality (AR) systems such as magic leap 1® and Oculus®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices 105 may be capable of executing various different applications such as various Internet-related apps, communication applications (e.g., E-mail applications, short message service (SMS) applications) and may use various communication protocols.

Network(s) 115 are any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 115 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The network gateway 120 is a network node that forms a secure passage between two or more of the networks 115 operating in the same or different protocols. The network gateway 120 may provide network security using one or more of the following techniques: a firewall for monitoring incoming and outgoing network traffic, a virtual private network to provide private secure channels of communication, security scanning for identifying security flaws within the network(s), an access manager for authentication and authorization services, and the like. The network gateway 120 routes network traffic using a router and a service connecter that manages access to various software products, services, or systems (e.g., using a service subscription business model). The network mesh 125 is a local network topology in which the infrastructure 110 (e.g., bridges, switches, and other infrastructure devices) connect directly, dynamically and non-hierarchically to as many other nodes as possible and cooperate with one another to efficiently route data between devices and nodes. The network mesh 125 manages connections using one or more of the following techniques: load balancing, products, services, or systems discovery, network access, routing, and peering, traffic mirroring, and the like. The network(s) 115, network gateway 120, and network mesh 125 work in combination to manage all data that inflows or outflows from infrastructure 110.

The components 145 include one or more general purpose computers, specialized server computers (including, by way of example, PC (personal computer) servers, application specific servers, mid-range servers, mainframe computers, rack-mounted servers, etc.), server farms, server clusters, or any other appropriate arrangement and/or combination computers or systems that work individually or in combination to provide resources, data, services, or programs to client computing devices 105 over network(s) 115. The components 145 may further include one or more virtual machines running virtual operating systems, or other computing architectures involving virtualization such as one or more flexible pools of logical storage devices that can be virtualized to maintain virtual storage devices. In various embodiments, the components 145 are adapted to run one or more services or software applications that provide the functionality described in the present disclosure.

The components 145 also include one or more data repositories. These data repositories may be used to store data and other information in various embodiments. For example, one or more of the data repositories may be used to store information for providing data-driven technology solutions such as software as a medical device (SAMD) and store information for validation and deployment of source code to implement the data-driven technology solutions. The data repositories may reside in a variety of locations. For example, a data repository used by a component may be local to of the component or may be remote from the component and in communication with the component via a network-based or dedicated connection. Data repositories may be of different types. In certain embodiments, a data repository used by a component may be a database, for example, a centralized database, a distributed database, a NoSQL database, a relational database, or the like. One or more of these databases may be adapted to enable storage, update, and retrieval of data to and from the database in response to SQL-formatted commands. In certain embodiments, one or more of data repositories may also be used by applications to store application data. The data repositories used by applications may be of different types such as, for example, a key-value store repository, an object store repository, or a general storage repository supported by a file system.

The components 145 also include computing nodes adapted to run one or more programs such as services or software applications (e.g., the services or software applications offered as web-based or cloud services or the applications for implementing a continuous integration and continuous deployment (CI/CD) system) that provide the functionality described in the present disclosure. Each node is a representation of single machine optionally implemented within a cluster of nodes. The single machine may be a physical machine (e.g., a server in a datacenter) or a virtual machine hosted on a cloud provider such as Amazon Web Services™ (AWS) with a set of a set of CPU and RAM resources that can be utilized. In clusters, the nodes pool together their resources to form a more powerful machine. When the one or more programs are deployed onto the cluster, the cluster intelligently handles distributing work to the individual nodes. If any nodes are added or removed, the cluster can shift around work as necessary. It does not matter to the one or more programs, or the infrastructure 110, which individual machines are actually running the code.

The one or more programs deployed onto one or more clusters are packaged as containers. Containers are a widely accepted standard, and various images can be defined for deploying the one or more programs on the infrastructure 110. Containerization allows for the infrastructure 110 to create self-contained execution environments. Any program and all its dependencies can be bundled up into a single file and then shared on the infrastructure 110. Creating a container can be done programmatically, allowing for powerful fully automated CI/CD pipelines to be used for validating code and deployment of code on the infrastructure 110. The containers are wrapped into a higher-level structure known as the pod 130. Containers in the same pod 130 may share the same resources and local network. In some instances, containers can communicate with other containers in the same pod 130 as though they were on the same machine while maintaining a degree of isolation from others. The pods 130 are used as the unit of replication in the infrastructure 110. If programs or resources become overwhelmed with processing and a single pod 130 instance cannot carry the load, the infrastructure 110 may be configured to deploy new replicas of a pod 130 to the cluster as necessary. Even when not under heavy load, it may be beneficial to have multiple copies of a pod 130 running at any time in a production system to allow load balancing and failure resistance. The one or more instances of the pods 130 are provisioned on the cloud infrastructure system provided by the one or more cloud service providers 140.

The cloud infrastructure system provided by the one or more cloud service providers 140 include infrastructure resources that are utilized for facilitating the provision of the one or more instances of the pods 130 supporting various cloud services offered by infrastructure 110. To facilitate efficient utilization of these resources for provisioning the one or more instances of the pods 130, the resources may be bundled into sets of resources or resource modules (also referred to as "placement rings 135"). Each resource module or placement ring 135 may comprise a pre-integrated and optimized combination of resources of one or more types. In certain examples, different placement rings 135 may be pre-provisioned for different types of cloud services. For example, a first set of placement rings 135 may be provisioned for a SAMD service, a second set of placement rings 135, which may include a different combination of resources than placement rings 135 in the first set of placement rings 135, may be provisioned for data analytics service, and the like. For some cloud services, the resources allocated for provisioning the services may be shared between the services.

The digital health platform 100 further includes one or more kernels 150. The kernels 150 are adapted to run on each cloud infrastructure system provided by the one or more cloud service providers 140. The kernels 150 are cluster managers that provide resource allocation and isolation across distributed applications or frameworks across the entire digital health platform 100. The kernels 150 provide the one or more programs with application programming interfaces (APIs) for orchestration of services and software including resource management and scheduling. The architecture of the kernels 150 includes agent nodes for running tasks, master nodes for sending task to the agent nodes, a zookeeper for elections and for looking up address of master nodes, and frameworks to co-ordinate with the master nodes to schedule tasks onto agent nodes.

The digital health platform 100 further includes a CI/CD system 155. The CI/CD system 155 is implemented within the cloud infrastructure system and allows the digital health platform 100 to frequently update, test, and deliver changes within source code for the software products, services, or systems. As discussed in detail herein, in healthcare, there are government regulations regarding the security of data (e.g., data integrity and data privacy) to which software must adhere. In the CI/CD system 155, these policy regulations can be included in the code, allowing compliance to be tracked, validated, and reconfigured automatically. In an example of SAMD, data storage locations, server access controls, and activity logging can be included in the source code, such that user data can be protected and managed throughout use of the software. Encryption and password-protected operations can additionally be included during continuous integration. During continuous delivery, security and monitoring tools can be used to track user activity and detect errors that could lead to a security threat.

The CI/CD system 155 may also be used for provisioning models. The models are initially trained using a dataset, but over time, the models may drift or the data may change, leading to a need for an updated models. If the models run within a software application, code associated with the software application can include triggers for when the models should be retrained. For example, the code may include instructions for the model to be retrained at predefined time intervals, when new training data is available, or when the performance of the model is determined to fall below a threshold. Additionally, software developers may explore variations in model architectures and hyperparameters in a testing environment based on monitoring the performance of the model in a production environment or based on estimated improvements for model optimization. The CI/CD system 155 allows for easy building, testing, and deployment to a production environment when the model is determined to meet performance requirements.

III. Model System

Figure 2:
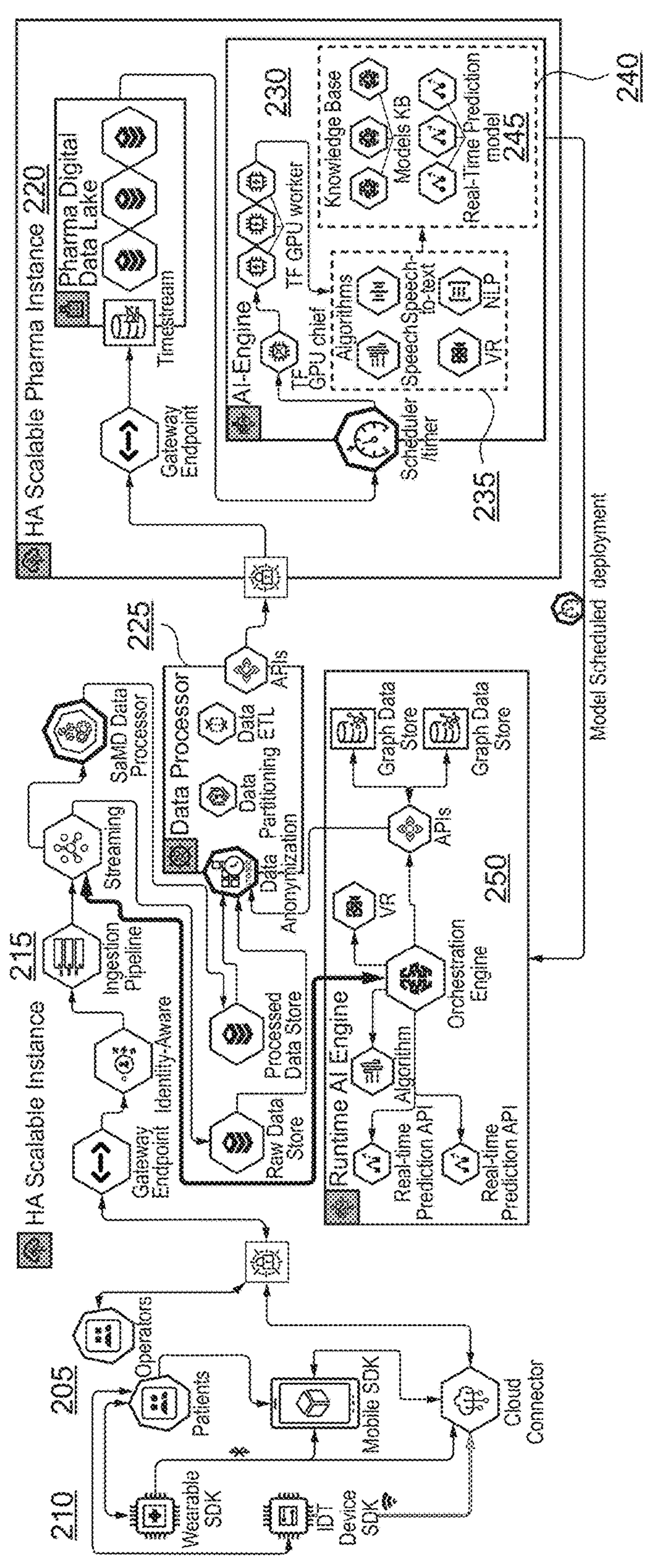
FIG. 2 depicts a diagram of a model system according to various embodiments.

FIG. 2 depicts a simplified diagram of a model system 200 (including the various components 145 of the infrastructure 110 described with respect to FIG. 1) for privacy-preserving computing in accordance with various embodiments. In the illustrated embodiment, model system 200 includes users 205 (e.g., subjects and/or operators), various devices 210 (e.g., personal computers, medical devices, IoT devices, and the like), a local server 215, and a remote server 220. The local sever 215 and remote server 220 represent various scalable instances of components of the infrastructure 110 described with respect to FIG. 1. The local server 215 is maintained within the region (e.g., country or state) of origin of the data (e.g., healthcare data). Whereas, the remote server 220 is maintained anywhere without respect to the region of origin of the data. In some instances, the remote server 220 is located in a same region as the local server 215 (but separate from one another). In other instances, the remote server 220 is located in a different region from that of the local server 215. Although only a single instance of each the local server 215 and the remote server 220 are shown, it should be understood that multiple instances may be implemented within the digital health platform and each local server 215 and remote server would have its own set of components illustrated in FIG. 2.

The various devices 210 may be actively or passively operated upon by the users 205 and in doing so generate and/or collect data (e.g., healthcare data may be generated and/or collected from a SAMD application running on a mobile device or healthcare data may generated and/or collected from a neuromodulation device implanted in a subject). In some instances, a software development kit associated with one or more applications on the devices 210 is adapted to allow for the collection and processing of the generated data by the one or more applications prior to transmitting the data to the local server 215 via secure communication. For example, the software development kit may provide a set of tools that allows for the collection and de-identification of the data. In other instances, the raw data generated from the devices 210 or one or more applications on the devices 210 is transmitted to the local server 215 via secure communication without prior collection and/or processing (e.g., de-identification).

The device 210 may securely communicate (i.e., communicate in a way not susceptible to eavesdropping or interception) with the digital health platform via a distributed computing environment connector and a DNS. The DNS is a hierarchical distributed database that stores IP addresses and other data, and allows for the IP addresses to be looked up by name for forwarding calls to the IP addresses. For example, when a secure communication for transmitting data is received from a device 210 by the digital health platform, the distributed computing environment connector identifies an instance of a local server 215 capable of processing the data, forwards the secure communication and an identifier of the instance of the local server 215 capable of processing the data to the DNS, the DNS looks up the IP addresses and other data associated with the instance of the local server 215, and forwards the secure communication to a gateway end point of a gateway (e.g., gateway 120 described with respect to FIG. 1) associated with instance of the local server 215.

Once connected to the gateway end point, the device 210 can engage in secure communication with the local server 215 and transmit the data for storage and processing. In some instances, identify awareness may be used to monitor communication with the local server 215 and data traffic. This allows for the local server 215 to enforce access and audit the data based on identity. Identity awareness maps users and device identifiers allowing for data transfer and access to be granted or denied based on identity policies.

The local server 215 comprises a data processor 225 adapted to de-identify, anonymize, store, and/or process the data as part of one or more operations or services offered by the local server. The data received by the local server 215 may be stored depending on the type of data received and one or more policies or rules governing the storage of the data (e.g., set of data regulations). For example, streaming data may be de-identified and stored in a raw data store; whereas batch and processed data may be anonymized and stored in a processed data store. Similarly, the data received by the local server 215 may be processed depending on the type of data received and one or more policies or rules governing the processing of the data (e.g., set of data regulations). For example, streaming data may be de-identified and processed in accordance with one or more operations pertaining to a streaming program (e.g., a DAG pipeline) and SAMD batch data may be anonymized and processed in accordance with one or more operations pertaining to a SAMD program (e.g., standardization of medical images for AI or ML model ingestion and de-identification of personal identifiers).

The de-identifying includes one or more operations to remove or manipulate to break the linkage between direct and known indirect personal identifiers and real world identities (personally identifiable information). The one or more operations are reversible, and thus the data may be re-identified. The anonymization includes one or more operations to remove or manipulate the personally identifiable information, which results in anonymized data that cannot be re-associated with any real world identities. The one or more operations for anonymization include data masking, pseudonymization, generalization, data swapping, data perturbation, synthetic data, or any combination thereof. Data masking is a technique to hide data with altered values. For example, a value character within the data may be replaced with a symbol such as "*" or "x". Pseudonymization is a data management and de-identification technique that replaces private identifiers with fake identifiers or pseudonyms, for example replacing the identifier "Bob Crown" with "John Duke". Generalization is a technique to remove a portion of the data or replaces some part of the data with a common value. For example, generalization may be used to remove or replace segments of all social security or medical insurance numbers with the same sequence of numbers. Data swapping (also known as shuffling and permutation) is a technique used to rearrange the dataset attribute values so they don't correspond with the original records. Data perturbation is a technique that modifies the original dataset slightly by applying techniques that round numbers and add random noise. Synthetic data is a technique to algorithmically manufacture information that has no connection to real events. Synthetic data is used to create artificial datasets instead of altering the original dataset or using it as is and risking privacy and security.

The data processor 225 is further adapted to partition the data and store the data in data partitions with like data. The data may be stored together by service/application/SAMD it is associated with, device ID, country of origin, healthcare system of origin, and the like. The data processor 225 can securely communicate with a gateway end point of a gateway (e.g., gateway 120 described with respect to FIG. 1) associated with the instance of the remote server 220. Once connected to the gateway end point, the local server 215 can engage in secure communication with the remote server 220 and transmit, using extract, transform, load techniques via application programming interfaces, the data for further processing. The data received by the remote server 220 is stored in one or more data stores (e.g., a data lake or repository local or remote to the remote server 220).

The remote server 220 comprises a training AI engine 230 adapted to train one or more algorithms and/or models 235 and generate a knowledge base 240 of production models 245. The training AI engine 230 may be adapted to run data stored in one or more data stores through the algorithms and/or models 235. In some embodiments, the running comprises executing a training workflow that includes: creating one or more local instances of the algorithms and/or models 235, splitting the data into one or more sets of training data and one or more sets of testing data, training the one or more local instances of the algorithms and/or models 235 on the sets of training data to generate production models 245, optionally integrating results from the training each of the one or more local instances of the algorithms and/or models 235 into a fully federated production model 245, running the one or more sets of testing data through the production model 245, and computing performance of the production model 245 based on the running of the one or more sets of testing data. In some embodiments, the running comprises executing a validation workflow that includes: splitting, combining and/or transforming the data into one or more sets of validation data, running the one or more sets of validation data through the production model 245, and computing performance of the production model 245 based on the running of the one or more sets of validation data.

Once the production models 245 are trained and/or validated, the production models 245 are stored in the knowledge base 240 and can be deployed on the local server 215 for runtime analysis of data communicated by a device 210 (i.e., data generated and/or collected and transmitted by devices 210 that was not used in the training of the production models—for simplicity of description this data is referred to herein as subsequent data). The deployment of the production models 245 on the local server can be implemented via a deployment schedule, rule or policy based, or some other similar means of deployment. Once deployed, the production models 245 are stored and implemented via a runtime AI engine 250 adapted to orchestrate services or software applications comprising use of the production models 245. These services or software applications may be offered as web-based or cloud services, such as under an AaaS or SaaS model to users of client computing devices.

As part of the services or software applications, the production models 245 are used by the runtime AI engine 250 to analyze subsequent data and generate an inference or prediction from the analysis of the subsequent data. An inference refers to using the production model 245 to learn about the data generation process (e.g., inferring how disease state of a subject is influenced by the size and location of a tumor); whereas, a prediction refers to using the production model 245 to predict outcomes for new data points (e.g., predicting a partial oxygen value from current vitals and respirator settings). Thereafter, the inference or prediction is communicated to the device 210 for use in one or more operations performed by the device 210. The one or more operations can be as simple as storage or display of the inference or prediction on the device 210 to more complex operations such as use in controlling one or more parameters of the device 210 (e.g., using the predicted partial oxygen value to control a parameters of the respirator) or use in diagnosis and recommendation or administration of a treatment based on the diagnosis.

IV. Techniques for Deployment of a Service on a Digital Health Platform

Figure 3:
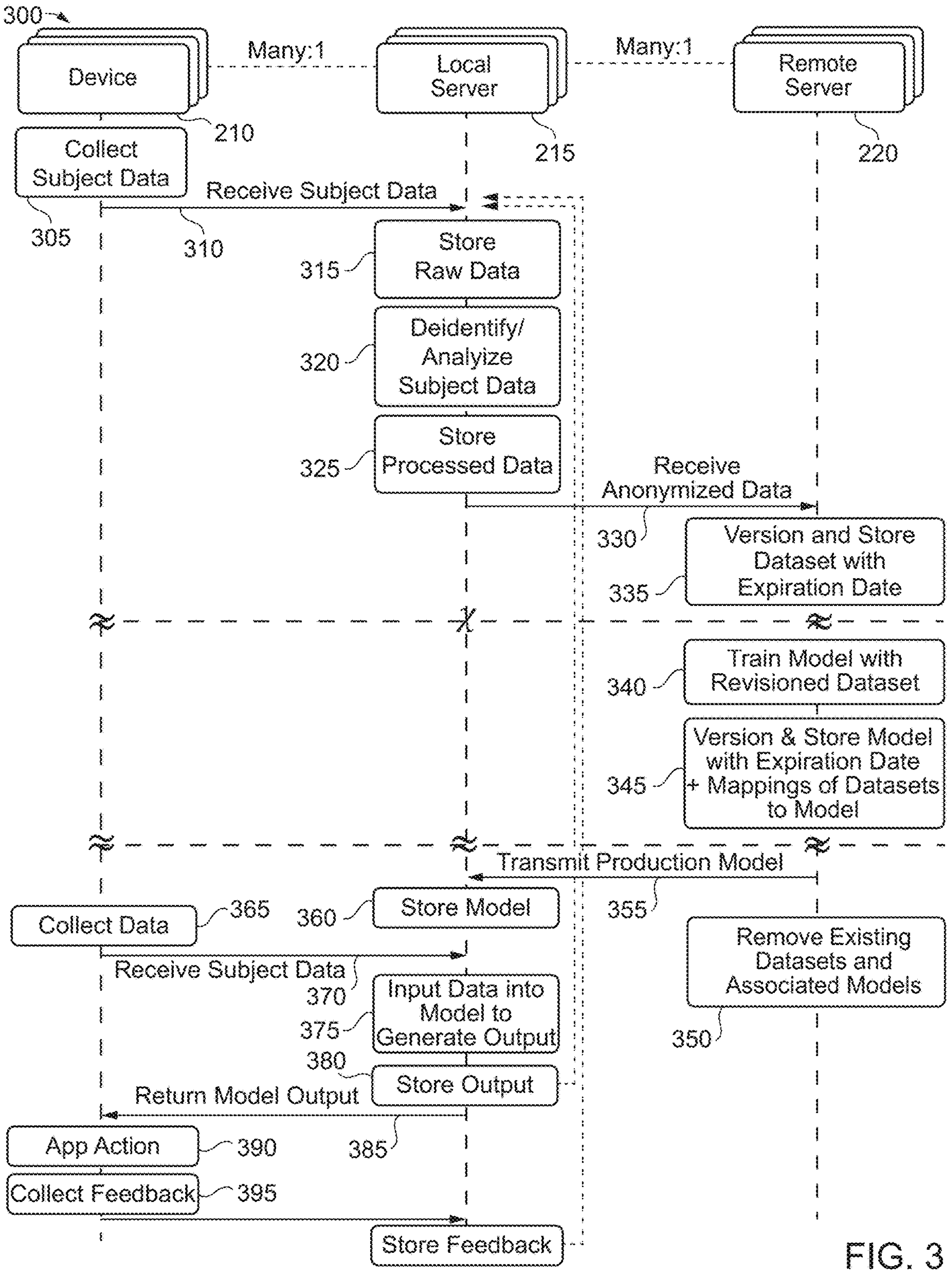
FIG. 3 depicts a swim lane diagram illustrating a process for privacy-preserving computing in a digital health platform according to various embodiments.
Figure 4:
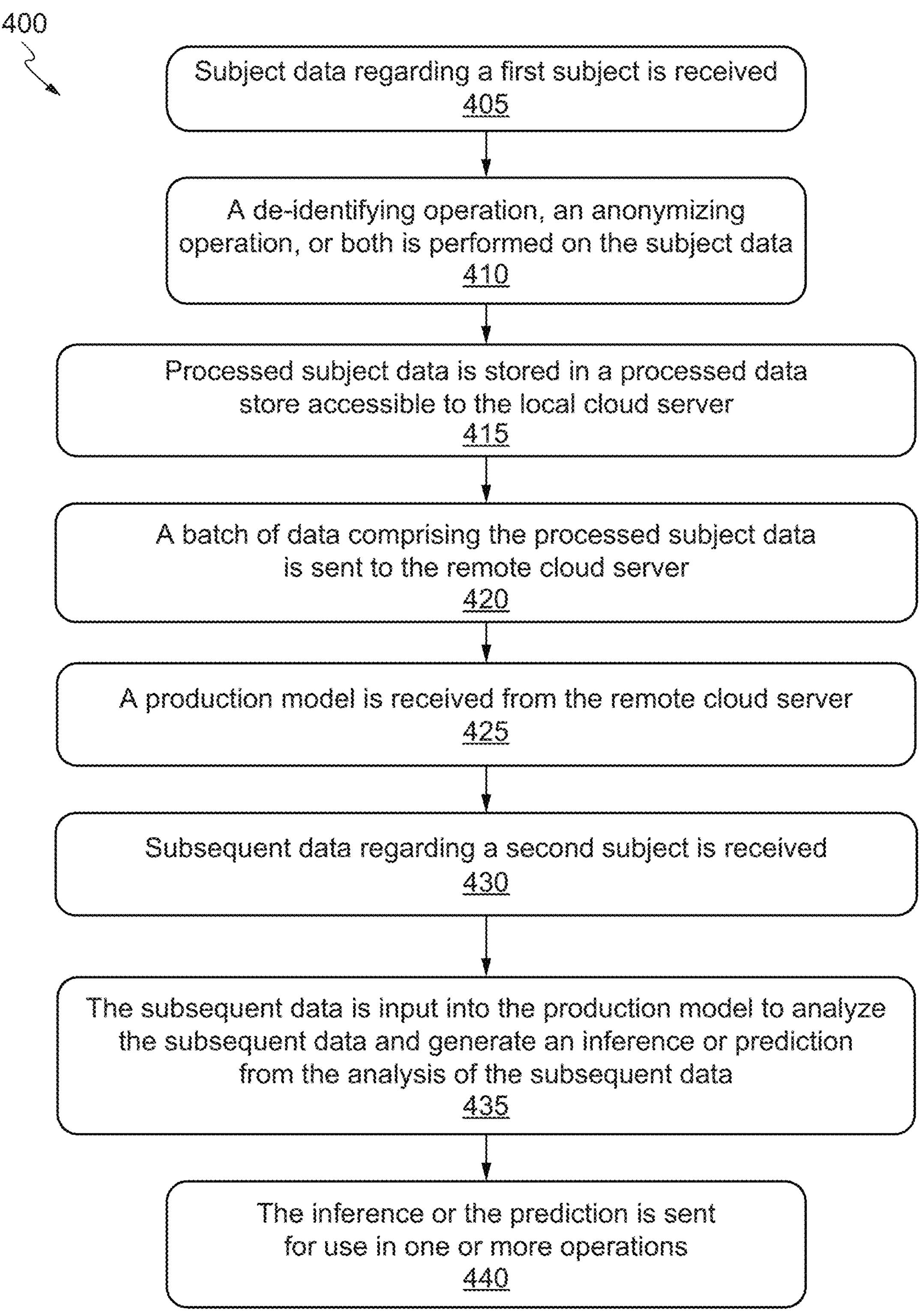
FIG. 4 depicts a flowchart illustrating a privacy-preserving computing carried out by a local cloud server on subject data used to develop artificial intelligence tools according to various embodiments.
Figure 5:
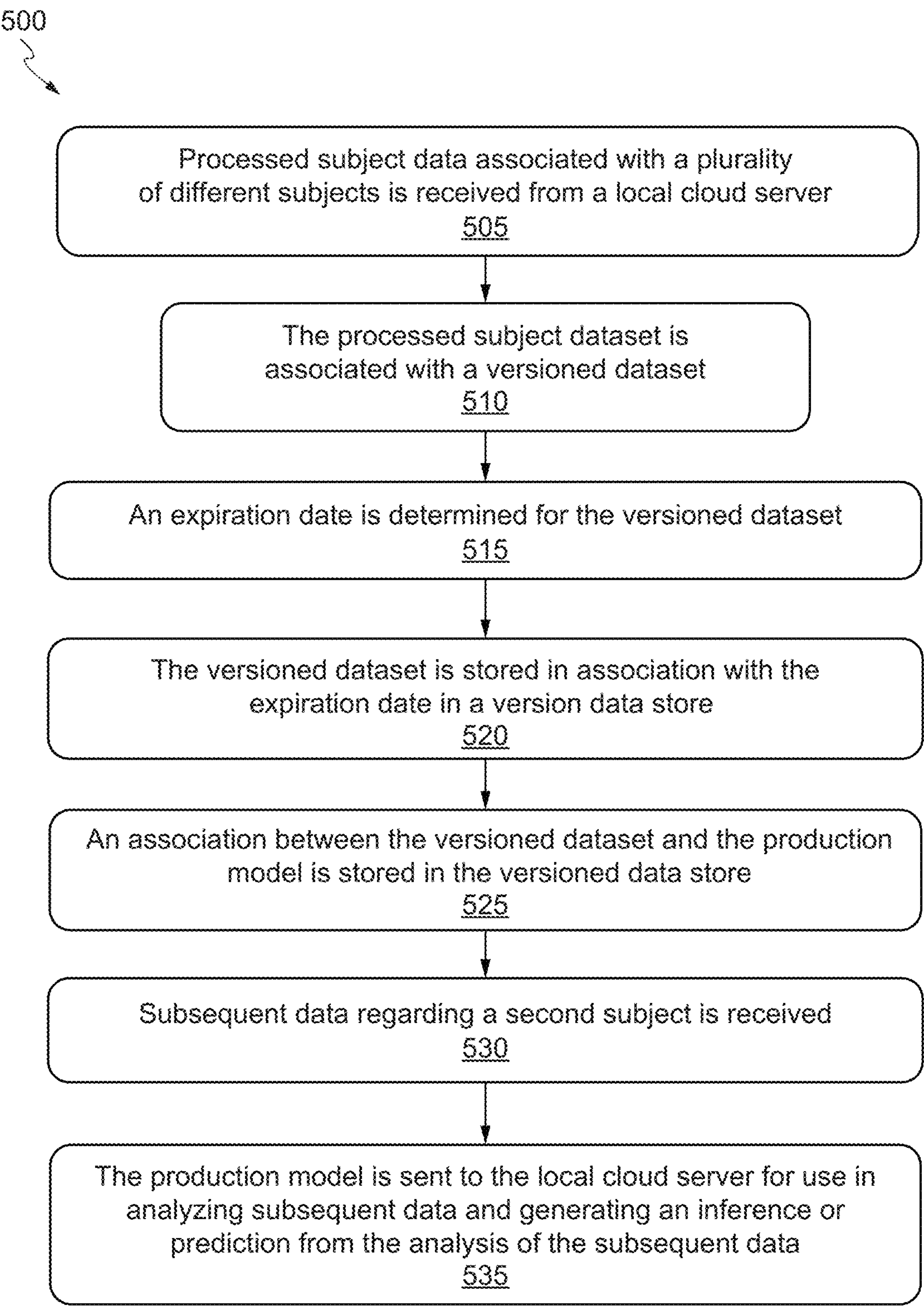
FIG. 5 depicts a flowchart illustrating a privacy-preserving computing carried out by a remote cloud server on subject data used to develop artificial intelligence tools according to various embodiments.

FIGS. 3-5 illustrate processes and operations for privacy-preserving computing to protect a subject's privacy while using the subject's data for secondary purposes such as training and deploying artificial intelligence tools. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 3-5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 3-5 is not intended to be limiting. Other sequences of steps may also be performed according to alternative embodiments. For example, in alternative embodiments the steps outlined above may be performed in a different order. Moreover, the individual steps illustrated in FIGS. 3-5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 illustrates a flowchart 300 for privacy-preserving computing in a digital health platform. The processes depicted in flowchart 300 are implemented by the architecture, systems, and techniques depicted in FIGS. 1 and 2.

At step 305, data (e.g., healthcare data) is collected by a device (e.g., devices 210 described with respect to FIG. 2). In some instances, the data includes individually identifiable health information. The device may be actively or passively operated upon by a user, and in doing so, generates and/or collects data. In some instances, the data is de-identified by the device. In some instances, the data is collected by one or more devices (e.g., multiple devices operated upon by a same user of different users).

At step 310, the data is transmitted by the device to a local server (e.g., the local server 215 described with respect to FIG. 2). The local server is part of a distributed computing environment (e.g., cloud computing environment) such as a local cloud server. The local server is maintained within a region of origin of the data. The region may be a geographic region (e.g., country or state) and the local server may be physically located in a same region as a user or device generating and collecting the data. In some instances, the one or more devices are located within a same region and transmit their collected data to a same local server (regionally—many:1). In other instances, the one or more devices are distributed across multiple regions and transmit their collected data to local servers assigned for each region (regionally—many:1 and globally many:many). Each region collectively shares a set of data regulations regarding the use and storage of a subject's data and the local server processing is adapted to use and store the data in compliance with the set of data regulations.

At step 315, the local server stores the data (raw data from the devices) in one or more local data stores. The local server stores the data in compliance with the set of data regulations. For example, if the set of data regulations state that individually identifiable health information must be de-identified while in storage, then the local server performs a de-identification operation on the data prior to storage. Additionally or alternatively, if the set of data regulations state that individually identifiable health information must be anonymized prior to storage, then the local server performs an anonymizing operation on the data prior to storing. The data may be stored for subsequent processing or transmission as part of one or more operations or services offered by the local server. For example, the data may be stored in a data store prior to input into one or more algorithms or models adapted to provide at least a portion of a service offered by the local server.

At step 320, the local server processes the data and generates processed data (e.g., analysis data or anonymized data). The local server processes the data in compliance with the set of data regulations. For example, if the set of data regulations state that individually identifiable health information must be de-identified prior to processing or transmission, then the local server performs a de-identifying operation on the data prior to processing or transmission. Additionally or alternatively, if the set of data regulations state that individually identifiable health information must be anonymized prior to processing or transmission, then the local server performs an anonymizing operation on the data prior to processing or transmission. The data may be processed by the local server as part of one or more operations or services offered by the local server. For example, the processing may comprise: (i) inputting the data into one or more algorithms or models adapted to generate analysis data to be provided as at least a portion of a service offered by the local server; and/or (ii) transmitting the de-identified or anonymized data to one or more remote servers for storage and/or downstream processing (e.g., training one or more algorithms or models).

At step 325, the local server stores the processed data (e.g., analysis data or anonymized data) in one or more local data stores. The local server stores the processed data in compliance with the set of data regulations. The data may be stored for subsequent processing or transmission as part of one or more operations or services offered by the local server. For example, the data may be stored in a data store prior to transmission to one or more remote servers for storage and/or downstream processing.

At step 330, the processed data is transmitted by the local server to a remote server (e.g., the remote server 220 described with respect to FIG. 2). The remote server is part of a distributed computing environment (e.g., cloud computing environment) such as a remote cloud server. The remote server is maintained within a region that is the same or different from the origin of the data. The region may be a geographic region (e.g., country or state) and the remote server may be physically located in a same or different region as a user or device generating and collecting the data. In some instances, the one or more local servers are located within a same region and transmit their processed data to a single remote server located within a same or different region as one of the one or more local servers (regionally—many:1). In other instances, the one or more local servers are distributed across multiple regions and transmit their process data to a one or more remote servers assigned for one or more regions (regionally—many:1 and globally many: many). Each region collectively shares a set of data regulations regarding the use and storage of a subject's data and the remote server processing is adapted to use and store the data in compliance with the set of data regulations.

At step 335, the remote server identifies a version of the processed data and associates the process data with a versioned dataset based on the identified version. If a versioned dataset is not available for association, then a new versioned dataset is created for the identified version and the processed data is associated with the new versioned dataset. Association of the processed data with a versioned dataset subjects the processed data to version control. As part of the version control, the remote server determines an expiration date for the versioned dataset and stores the versioned dataset with the expiration date. The expiration date may be determined based on a date of creation of the versioned dataset, a date of received of the processed data, an expiry of an informed consent form associated with the processed data, or a combination thereof. The versioned dataset is stored in one or more data stores local or remote to the remote server.

At step 340, the remote server trains one or more algorithms and/or models using the versioned dataset (e.g., a training subset of the versioned dataset).

The training process for a model may include selecting hyperparameters for and performing iterative operations of inputting data from the one or more sets of training data into the model to find a set of model parameters (e.g., weights and/or biases) that minimizes one or more loss or error functions for the model. The hyperparameters are settings that can be tuned or optimized to control the behavior of the model. Most models explicitly define hyperparameters that control different aspects of the algorithms and/or models such as memory or cost of execution. However, additional hyperparameters may be defined to adapt the model to a specific scenario. For example, the hyperparameters may include the number of hidden units of a model, the learning rate of a model, the convolution kernel width, or the number of kernels for a model. Each iteration of training can involve finding a set of model parameters for the model (configured with a defined set of hyperparameters) so that the value of the one or more loss or error functions using the set of model parameters is smaller than the value of the one or more loss or error functions using a different set of model parameters in a previous iteration. The one or more loss or error functions can be constructed to measure the difference between the outputs inferred using the models (e.g., the segmentation boundary around one or more instances of an object of interest) and a ground truth (e.g., a segmentation boundary annotated to images using the labels).

Once the set of model parameters are identified, the model has been trained and can be validated using the versioned dataset (e.g., a testing or validation subset of the versioned dataset). The validation process includes iterative operations of inputting data from the versioned dataset into the model using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of data from the versioned dataset are input into the model to obtain output for example, a segmentation boundary around one or more objects of interest), and the output is evaluated versus ground truth segmentation boundaries using correlation techniques such as Bland-Altman method and the Spearman's rank correlation coefficients and calculating performance metrics such as the error, accuracy, precision, recall, receiver operating characteristic curve (ROC), etc.

At step 345, once the algorithms and/or models are trained and validated, the remote server identifies a version of the algorithms and/or models and associates the algorithms and/or models with a versioned set of algorithms and/or models based on the identified version. For example, the remote server can identify the version of the algorithms and/or models as Version X. The remote server associates the algorithms and/or models with the set of algorithms and/or models of Version X. If a versioned set of algorithms and/or models is not available for association, then a new versioned set of algorithms and/or models is created for the identified version and the algorithms and/or models are associated with the new versioned set of algorithms and/or models. Association of the new versioned set of algorithms and/or models with a versioned set of algorithms and/or models subjects the algorithms and/or models to version control. As part of the version control, the remote server determines an expiration date for the versioned set of algorithms and/or models and stores the versioned set of algorithms and/or models with the expiration date. As an additional part of the version control, the versioned set of algorithms and/or models are mapped to the versioned dataset used for training and validating the versioned set of algorithms and/or models. This mapping or association is then stored with the versioned dataset and/or the versioned set of algorithms and/or models. The expiration date may be determined based on a date of training of the versioned set of algorithms and/or models, a date of validation of the versioned set of algorithms and/or models, the expiration of the associated versioned dataset, or a combination thereof. The versioned set of algorithms and/or models are stored in one or more data stores local or remote to the remote server.

At step 350, as an additional part of the version control, the remote server removes or deletes existing versioned datasets and versioned sets of algorithms and/or models from the one or more data stores based on the associated respective expiration dates. As should be understood, the version control implemented by the remote server can be adapted to remove or delete existing associated versioned datasets and versioned sets of algorithms and/or models at a same time based on an associated expiration date such that there are no algorithms and/or models existing in the one or more data stores without associated versioned datasets used to train and validate the algorithms and/or models.

At step 355, the trained and validated (referred to as production) algorithms and/or models selected from the versioned sets of algorithms and/or models are transmitted to one or more local servers for deployment.

At step 360, the local server stores the production algorithms and/or models in one or more local data stores.

At step 365, subsequent data (e.g., healthcare data) is collected by a device as described with respect to step 305. The subsequent data is data not used to train or validate the production algorithms and/or models, though the subsequent data may later be used to generate an inference or prediction (as discussed in step 375). The subsequent data may be generated and/or collected from the same or different users and devices as the data generated and/or collected in step 305. As should be understood, the subsequent data could effectively be any data collected by the devices used by the users, as described with respect to step 305.

At step 370, the subsequent data is transmitted by the device to the local server, as described with respect to step 310.

At step 375, the local server stores and processes the subsequent data (raw data from the devices and processed data from a operation or processor), as described with respect to steps 315-335. In some instances, the processing comprises inputting the subsequent data into one or more of the production algorithms and/or models. For example, as part of the services or software applications provided by the local server, the one or more of the production algorithms and/or models are used to analyze the subsequent data and generate an inference or prediction from the analysis of the subsequent data.

At step 380, the inference or prediction from the analysis of the subsequent data is stored in one or more data stores.

At step 385, the inference or prediction is communicated to the device for use in one or more operations performed by the device. The device may be the same device or a different device from the device that generated and/or collected the subsequent data.

At step 390, the device performs the one or more operations using the inference or prediction. The one or more operations can be as simple as storage or display of the inference or prediction on the device to more complex operations such as use in controlling one or more parameters of the device (e.g., using the predicted partial oxygen value to control a parameters of the respirator) or use in diagnosis and recommendation or administration of a treatment based on the diagnosis. In some instances, the one or more operations triggers or causes the generation of feedback data concerning the inference or prediction. For example, a positive predictive value of the inference or prediction may be generated as a result of using the inference or prediction in the one or more operations.

At step 395, the feedback is collected by the device, transmitted to the local server, and stored by the local server in one or more data stores. The feedback may itself be a form of subject data. In addition to the inference or prediction, the feedback can include data for any response or activity triggered based on the one or more operations of step 390. For example, the feedback can include actions to be taken by the subject or a provider based on the inference or prediction. In some instances, the feedback can indicate the subject is to take a digital test (e.g., an eye test), adjust their diet, take medication, or record their blood pressure. The feedback may additionally trigger or a machine to automatically record a measurement value (e.g., O2 saturation). The feedback may be used in downstream processing to determine effectiveness of the production algorithms and/or models and/or subsequent training of the production algorithms and/or models.

FIG. 4 illustrates a process 400 for privacy-preserving computing carried out by a local cloud server on subject data used to develop artificial intelligence tools. At step 405, subject data regarding a first subject is received from a first computing device associated with the first subject. The subject data may be health care data comprising individually identifiable health information. The first computing device may be a clinical device sensor, a handheld portable device, or a combination thereof. The local cloud server may be physically located in a same geographic region as the subject. The same geographic region may be a same country. In some instances, the same geographic region collectively shares a set of data regulations regarding use and storage of the individually identifiable health information.

At step 410, a de-identifying operation, an anonymizing operation, or both is performed on the subject data to generate processed subject data. The de-identifying operation, the anonymizing operation, or both may be performed on the individually identifiable health information of the subject data based on a set of data regulations (e.g., HIPAA regulations). In some instances, prior to performing the de-identifying operation, the anonymizing operation, or both on the subject data, the subject data is stored in a raw data store accessible to the local cloud server.

At step 415, the processed subject data is stored in a processed data store accessible to the local cloud server. The processed data store is not accessible to a remote cloud server.

At step 420, a batch of data comprising the processed subject data is sent to the remote cloud server. The sending of the batch data may occurs at a periodic or stochastic timing such that the batch of data includes data from multiple other subjects captured since a previous sending of data to the remote cloud server. In some instances, the sending occurs responsive to the local cloud server having not received a request for deletion of the processed subject data prior to the sending the processed subject data. In some instances, a request is received from the remote cloud server to delete the subject data, and in response to receiving the request, the subject data is deleted from the raw data store. However, the processed subject data may not be deleted from the processed data store. In other instances, a request is received from the remote cloud server to delete the processed subject data, and in response to receiving the request, the processed subject data is deleted from the processed data store.

At step 425, a production model is received from the remote cloud server. The production model including parameters derived in part from the processed subject data. The parameters may be derived based on minimizing one or more loss functions.

At step 430, subsequent data regarding a second subject is received from a second computing device associated with the second subject. The subsequent data may be subsequent healthcare data comprising individually identifiable health information. The first computing device is the same or different device as the second computing device. The second computing device may be a clinical device sensor, a hand-held portable device, or a combination thereof. The first user is the same or a different user as the second user. In some instances, the de-identifying operation, the anonymizing operation, or both are performed on the subsequent data to generate processed subsequent data, the processed subsequent data is stored in the processed data store accessible to the local cloud server, and a batch of data comprising the processed subsequent data is sent to the remote cloud server.

At step 435, the subsequent data is input into the production model to analyze the subsequent data and generate an inference or prediction from the analysis of the subsequent data. The inference or the prediction may be generated with respect to a diagnosis, a prognosis, a treatment or therapy, identification of a treatment or therapy protocol, detection or determination of a disease state, identification or detection of a biomarker, a reduction in treatment or therapy non-adherence, a reduction in operational cost, image analysis, marketing of a treatment or therapy, automation of an administrative task, assistance with a medical procedure, or any combination thereof. A subsequent batch of data comprising the inference or the prediction may be sent to the remote cloud server. In some instances, the de-identifying operation, the anonymizing operation, or both are performed on the inference or the prediction to generate processed output data, the processed output data is stored in the processed data store accessible to the local cloud server, and a batch of data comprising the processed output data is sent to the remote cloud server.

At step 440, the inference or the prediction is sent to the second computing device, a third computing device, or both for use in one or more operations performed by the second computing device, the third computing device, or a combination thereof. The one or more operations may include communicating or displaying the inference or the prediction, analysis of the inference or the prediction, providing a treatment or therapy, initiating a treatment or therapy protocol, measuring a biomarker, providing a notice or reminder for a treatment or therapy, obtaining healthcare data, reporting a diagnosis or a prognosis, analyzing an image, providing marketing regarding a treatment or therapy, control of a medical device or a medical procedure, or any combination thereof. In some instances, response data is received at the local cloud server from the second computing device, the third computing device, or both. The response data is generated in response to receiving the inference or the prediction or using the inference or the prediction in the one or more operations. The de-identifying operation, the anonymizing operation, or both, is performed on the response data to generate processed response data. The processed response data is stored in the processed data store, and a batch of data comprising the processed response data is sent to the remote cloud server. In some instances, a new production model is received from the remote cloud server, the new production model including parameters derived in part from the processed response data, and the production model is replaced with the new production model. The replacing may include deleting the production model from the local cloud server.

FIG. 5 illustrates a process 500 for privacy-preserving computing carried out by a remote cloud server on subject data used to develop artificial intelligence tools. At step 505, processed subject data associated with a plurality of different subjects is received from a local cloud server, the processed subject data having been de-identified, anonymized, or both. The processed subject data may be health care data comprising individually identifiable health information. The local cloud server may be physically located in a same geographic region as the subjects. The remote cloud server is physically located in a same or different geographic region as the local cloud server. The same geographic region may be a same country. In some instances. the same geographic region collectively shares a set of data regulations regarding use and storage of the individually identifiable health information. The individually identifiable health information of the processed subject data may have been de-identified, anonymized, or both based on the set of data regulations.

At step 510, the processed subject dataset is associated with a versioned dataset. In some instances, the association comprises identifying a version of the processed subject dataset and associating the processed subject dataset with a versioned dataset based on the identified version of the processed subject dataset. If a versioned dataset is not available for association, then a new versioned dataset is created for the identified version of the processed subject dataset and the processed subject dataset is associated with the new versioned dataset.

At step 515, an expiration date is determined for the versioned dataset. The expiration date is determined based a date of creation of the versioned dataset, a date of receipt of the processed subject data, an expiry of an informed consent form associated with the processed subject dataset, or any combination thereof.

At step 520, the versioned dataset is stored in association with the expiration date in a version data store accessible to the remote cloud server. The version data store is not accessible to the local cloud server.

At step 525, a production model is trained using the versioned dataset. The production model comprises parameters that are derived in the training based on minimizing one or more loss functions.

At step 530, an association between the versioned dataset and the production model is stored in the versioned data store. The production model may also be stored in the versioned data store. In some instances, in response to the expiration date passing, the versioned dataset and the production model are deleted or removed from the versioned data store.

At step 535, the production model is sent to the local cloud server for use in analyzing subsequent data and generating an inference or prediction from the analysis of the subsequent data. The subsequent data may be subsequent healthcare data comprising individually identifiable health information. The inference or the prediction may be generated with respect to a diagnosis, a prognosis, a treatment or therapy, identification of a treatment or therapy protocol, detection or determination of a disease state, identification or detection of a biomarker, a reduction in treatment or therapy non-adherence, a reduction in operational cost, image analysis, marketing of a treatment or therapy, automation of an administrative task, assistance with a medical procedure, or any combination thereof.

In some instances, another production model is trained using the versioned dataset and/or another versioned dataset, an association between the versioned dataset and/or the another versioned dataset and the another production model is stored in the versioned data store, and the another production model is sent to the local cloud server for use in analyzing the subsequent data and generating the inference or prediction from the analysis of the subsequent data. The another production model may be sent with an instruction to the local cloud server to replace the production model with the another production model.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method carried out by a local cloud server being physically located within a same regulatory jurisdiction as a first subject and a first computing device associated with the first subject, comprising:

receiving subject data regarding a first subject from the first computing device associated with the first subject;

performing a de-identifying operation, an anonymizing operation, or both on the subject data to generate processed subject data;

programmatically evaluating storing and transmission of the processed subject data against one or more regulatory compliance rules associated with the regulatory jurisdiction;

storing the processed subject data in a processed data store accessible to the local cloud server upon verification of compliance of the storing based on the evaluating;

sending a batch of data to a remote cloud server, the batch of data comprising the processed subject data upon verification of compliance of the transmission based on the evaluating;

receiving a production model from the remote cloud server, the production model including parameters derived in part from the processed subject data;

receiving subsequent data regarding a second subject from a second computing device associated with the second subject;

inputting the subsequent data into the production model to analyze the subsequent data and generate an inference or prediction from the analysis of the subsequent data; and sending the inference or the prediction to the second computing device, a third computing device, or both for use in one or more operations performed by the second computing device, the third computing device, or a combination thereof; and sending a subsequent batch of data to the remote cloud server, the subsequent batch of data comprising the inference or the prediction.

2. The computer-implemented method of claim 1, wherein the subject data is healthcare data comprising individually identifiable health information regarding the first subject and the subsequent data is subsequent healthcare data comprising individually identifiable health information regarding the second subject.

3. The computer-implemented method of claim 2, wherein the de-identifying operation, the anonymizing operation, or both are performed on the individually identifiable health information of the subject data based on a set of data regulations associated with the regulatory jurisdiction.

4. The computer-implemented method of claim 1, wherein sending the processed subject data as a part of the batch of data to the remote cloud server occurs responsive to the local cloud server having not received a request for deletion of the processed subject data prior to the sending the processed subject data.

5. The computer-implemented method of claim 1, further comprising:

prior to performing the de-identifying operation, the anonymizing operation, or both on the subject data, storing the subject data in a raw data store accessible to the local cloud server;

receiving a request to delete the subject data from the remote cloud server; and in response to receiving the request to delete the subject data, deleting the subject data from the raw data store.

6. The computer-implemented method of claim 1, wherein the sending the processed subject data as a part of the batch of data occurs at a periodic or stochastic timing such that the batch of data includes data from multiple other subjects captured since a previous sending of data to the remote cloud server.

7. The computer-implemented method of claim 1, wherein the inference or the prediction are generated with respect to a diagnosis, a prognosis, a treatment or therapy, identification of a treatment or therapy protocol, detection or determination of a disease state, identification or detection of a biomarker, a reduction in treatment or therapy non-adherence, a reduction in operational cost, image analysis, marketing of a treatment or therapy, automation of an administrative task, assistance with a medical procedure, or any combination thereof.

8. The computer-implemented method of claim 1, wherein the one or more operations include communicating or displaying the inference or the prediction, analysis of the inference or the prediction, providing a treatment or therapy, initiating a treatment or therapy protocol, measuring a biomarker, providing a notice or reminder for a treatment or therapy, obtaining healthcare data, reporting a diagnosis or a prognosis, analyzing an image, providing marketing regarding a treatment or therapy, control of a medical device or a medical procedure, or any combination thereof.

9. The computer-implemented method of claim 1, further comprising:

performing the de-identifying operation, the anonymizing operation, or both on the subsequent data to generate processed subsequent data;

storing the processed subsequent data in the processed data store accessible to the local cloud server; and sending a batch of data to the remote cloud server, the batch of data comprising the processed subsequent data.

10. The computer-implemented method of claim 1, further comprising:

performing the de-identifying operation, the anonymizing operation, or both on the inference or the prediction to generate processed output data;

storing the processed output data in the processed data store accessible to the local cloud server; and sending a batch of data to the remote cloud server, the batch of data comprising the processed output data.

11. The computer-implemented method of claim 1, further comprising:

receiving response data at the local cloud server from the second computing device, the third computing device, or both generated in response to receiving the inference or the prediction or using the inference or the prediction in the one or more operations;

performing the de-identifying operation, the anonymizing operation, or both on the response data to generate processed response data;

storing the processed response data in the processed data store; and sending a batch of data to the remote cloud server, the batch of data comprising the processed response data.

12. The computer-implemented method of claim 11, further comprising:

receiving a new production model from the remote cloud server, the new production model including parameters derived in part from the processed response data; and replacing the production model with the new production model, wherein the replacing includes deleting the production model from the local cloud server.

13. The computer-implemented method of claim 1, wherein the regulatory jurisdiction comprises a region defined by one or more healthcare data privacy laws.

14. The computer-implemented method of claim 13, wherein the remote cloud server is physically located in a different region than the region defined by one or more healthcare data privacy laws.

15. A system comprising:

a local cloud server physically located within a same regulatory jurisdiction as a first subject and a first computing device associated with the first subject, the local cloud server comprising one or more processors and one or more non-transitory computer-readable media storing instructions that, when executed by the one or more processors, cause the local cloud server to perform operations comprising:

receiving subject data regarding a first subject from the first computing device associated with the first subject;

performing a de-identifying operation, an anonymizing operation, or both on the subject data to generate processed subject data;

programmatically evaluating storing and transmission of the processed subject data against one or more regulatory compliance rules associated with the regulatory jurisdiction;

storing the processed subject data in a processed data store accessible to the local cloud server upon verification of compliance of the storing based on the evaluating;

sending a batch of data to a remote cloud server, the batch of data comprising the processed subject data upon verification of compliance of the transmission based on the evaluating;

receiving a production model from the remote cloud server, the production model including parameters derived in part from the processed subject data;

receiving subsequent data regarding a second subject from a second computing device associated with the second subject;

inputting the subsequent data into the production model to analyze the subsequent data and generate an inference or prediction from the analysis of the subsequent data; and sending the inference or the prediction to the second computing device, a third computing device, or both for use in one or more operations performed by the second computing device, the third computing device, or a combination thereof; and sending a subsequent batch of data to the remote cloud server, the subsequent batch of data comprising the inference or the prediction.

16. The system of claim 15, wherein the operations further comprise:

performing the de-identifying operation, the anonymizing operation, or both on the inference or the prediction to generate processed output data;

storing the processed output data in the processed data store accessible to the local cloud server; and sending a batch of data to the remote cloud server, the batch of data comprising the processed output data.

17. The system of claim 15, wherein the operations further comprise:

receiving response data at the local cloud server from the second computing device, the third computing device, or both generated in response to receiving the inference or the prediction or using the inference or the prediction in the one or more operations;

performing the de-identifying operation, the anonymizing operation, or both on the response data to generate processed response data;

storing the processed response data in the processed data store; and sending a batch of data to the remote cloud server, the batch of data comprising the processed response data.

18. A non-transitory computer-readable storage medium storing computer-executable instructions that, when executed by one or more processors of a local cloud server physically located within a same regulatory jurisdiction as a first subject and a first computing device associated with the first subject, cause the local cloud server to perform operations comprising:

receiving subject data regarding a first subject from the first computing device associated with the first subject;

performing a de-identifying operation, an anonymizing operation, or both on the subject data to generate processed subject data;

programmatically evaluating storing and transmission of the processed subject data against one or more regulatory compliance rules associated with the regulatory jurisdiction;

storing the processed subject data in a processed data store accessible to the local cloud server upon verification of compliance of the storing based on the evaluating;

sending a batch of data to a remote cloud server, the batch of data comprising the processed subject data upon verification of compliance of the transmission based on the evaluating;

receiving a production model from the remote cloud server, the production model including parameters derived in part from the processed subject data;

receiving subsequent data regarding a second subject from a second computing device associated with the second subject;

inputting the subsequent data into the production model to analyze the subsequent data and generate an inference or prediction from the analysis of the subsequent data; and sending the inference or the prediction to the second computing device, a third computing device, or both for use in one or more operations performed by the second computing device, the third computing device, or a combination thereof; and sending a subsequent batch of data to the remote cloud server, the subsequent batch of data comprising the inference or the prediction.

19. The non-transitory computer-readable storage medium of claim 18, wherein the operations further comprise:

performing the de-identifying operation, the anonymizing operation, or both on the inference or the prediction to generate processed output data;

storing the processed output data in the processed data store accessible to the local cloud server; and sending a batch of data to the remote cloud server, the batch of data comprising the processed output data.

20. The non-transitory computer-readable storage medium of claim 18, wherein the operations further comprise:

receiving response data at the local cloud server from the second computing device, the third computing device, or both generated in response to receiving the inference or the prediction or using the inference or the prediction in the one or more operations;

performing the de-identifying operation, the anonymizing operation, or both on the response data to generate processed response data;

storing the processed response data in the processed data store; and sending a batch of data to the remote cloud server, the batch of data comprising the processed response data.

* * * * *